United States Patent [19]

Slack

[11] Patent Number: 4,885,353

[45] Date of Patent: Dec. 5, 1989

[54] LIQUID ISOCYANATE PREPOLYMERS

[75] Inventor: William E. Slack, Moundsville, W. Va.

[73] Assignee: Mobay Corporation, Pittsburgh, Pa.

[21] Appl. No.: 272,184

[22] Filed: Nov. 16, 1988

[51] Int. Cl.$^4$ .................................... C08G 18/10
[52] U.S. Cl. .................................. 528/68; 528/59
[58] Field of Search .............................. 528/68, 59

[56] References Cited

U.S. PATENT DOCUMENTS

| | | | |
|---|---|---|---|
| 3,808,250 | 4/1974 | Blahak et al. | 260/455 |
| 3,817,940 | 6/1974 | Blahak et al. | 260/77.5 |
| 3,929,863 | 12/1975 | Blahak et al. | 260/471 |
| 3,975,428 | 8/1976 | Blahak et al. | 260/472 |
| 4,016,143 | 4/1977 | Blahak et al. | 260/77.5 |
| 4,136,091 | 1/1979 | Mazanek et al. | 260/455 |
| 4,169,206 | 9/1979 | Mazanek et al. | 560/50 |
| 4,180,644 | 12/1979 | Marquis et al. | 528/68 |
| 4,186,257 | 1/1980 | Blahak et al. | 521/159 |
| 4,228,249 | 10/1980 | Blahak et al. | 521/159 |
| 4,260,557 | 4/1981 | Mazanek et al. | 260/455 |
| 4,328,322 | 5/1982 | Baron | 521/163 |
| 4,504,648 | 3/1985 | Otani et al. | 528/76 |
| 4,515,981 | 5/1985 | Otani et al. | 560/50 |
| 4,609,683 | 9/1986 | Grigsby et al. | 521/159 |
| 4,609,684 | 9/1986 | Grigsby et al. | 521/163 |
| 4,611,083 | 9/1986 | Buethe et al. | 560/351 |
| 4,686,242 | 8/1987 | Turner et al. | 521/137 |
| 4,689,356 | 8/1987 | Peffley et al. | 521/159 |
| 4,703,100 | 10/1987 | Rasshofer et al. | 528/66 |
| 4,705,814 | 11/1987 | Grigsby et al. | 521/159 |
| 4,732,959 | 3/1988 | Otani et al. | 528/68 |

FOREIGN PATENT DOCUMENTS 0268849  6/1988  European Pat. Off. .

Primary Examiner—Maurice J. Welsh
Attorney, Agent, or Firm—Joseph C. Gil

[57] ABSTRACT

The present invention is directed to a liquid, storage-stable isocyanate prepolymer having an isocyanate group content of from 3 to 30% by weight, prepared by reacting
  (i) an isocyante selected from the group consisting of methylene bis(phenylisocyanates), polymethylene poly(phenylisocyanates), and mixtures thereof, and
  (ii) a polyamine of the structure

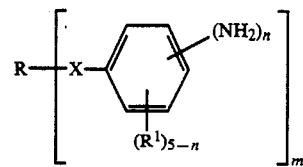

where R represents an m-valent residue obtained by the removal of m-functional groups from a compound having m-functional groups and having a molecular weight of from 76 to about 10,000, X represents

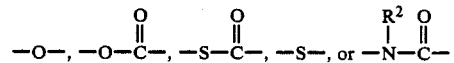

$R^1$ represents hydrogen or an inert substituent,
$R^2$ represents hydrogen, a $C_1$ to $C_5$ alkyl group or a phenyl group,
n is 1 or 2, and
m is an integer of from 2 to 8.

3 Claims, No Drawings

LIQUID ISOCYANATE PREPOLYMERS

BACKGROUND OF THE INVENTION

Urea-group containing polyisocyanate mixtures which are liquid at room temperature are known. See U.S. Pat. Nos. 4,611,083 and 4,703,100. Such mixtures are described as being prepared by reacting polyoxyalkylene polyamines having functionalities of from 2 to 5 and amine numbers of from 20 to 250 with specific polyisocyanates based on diphenylmethane diisocyanate. The polyisocyanates used are selected from the group consisting of (i) at least one diphenylmethane diisocyanate isomer and (ii) a mixture of diphenylmethane diisocyanates and polyphenyl polymethylene polyisocyanates where the diisocyanate content of the mixture is from 55 to 90 weight percent. See also U.S. Pat. No. 4,689,356. Similar products are described in U.S. Pat. No. 4,705,814, but the isocyanate used is an aliphatic isocyanate.

It is also known that diphenylmethane diisocyanate and its higher derivatives can form stable prepolymers with primary amine terminated materials having a degree of amination of from about 25 to 85% and with secondary amine-terminated materials having a degree of amination of from 25 to 100%. See, U.S. Pat. No. 4,686,242. The amines described in this reference are prepared by reacting a hydroxyl-terminated polyether with hydrogen and ammonia or a primary amine in the presence of catalysts to reductively aminate the polyether.

Isocyanate prepolymers are also known which can be prepared by reacting aromatic isocyanates with aromatic amine-amides. See, U.S. Pat. No. 4,609,683. The amides are described as being prepared by reacting isatoic anhydride with a polyoxyalkylene polyamine. Similar amides are described in U.S. Pat. Nos. 4,180,644 and 4,609,684, for use in making a variety of polyurethane type materials.

Compounds having terminal aromatic amine groups and having the general structure:

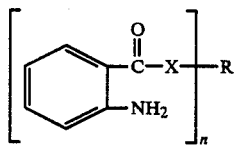

are known. In U.S. Pat. No. 3,808,250, X is defined as oxygen or sulfur, n is an integer of from 2 to 8, and R is defined as an n-valent radical obtained by the removal of hydroxy groups or mercapto groups from an n-valent polyether or polythioether having a molecular weight of from 600 to 10,000. U.S. Pat. Nos. 3,817,940 and 3,929,863 describe similar compounds where R is based on a polyol or polythiol having a molecular weight of less than 600. U.S. Pat. Nos. 3,975,428 and 4,016,143 describe similar compounds prepared by reacting isatoic acid anhydride with a compound containing at least two hydroxyl groups and at least one tertiary nitrogen group and having a molecular weight of from about 119 to about 1000. Similar compounds are described in U.S. Pat. Nos. 4,136,091, 4,169,206, 4,186,257, 4,228,249 and 4,260,557. Para substituted compounds are described in U.S. Pat. Nos. 4,504,648 and 4,515,981. Finally, similar para-, meta- and di-meta substituted compounds are described in U.S. 4,328,322 and 4,732,959. While all of these references describe that the compounds disclosed can be used to manufacture polyurethane products, none describe liquid isocyanate-terminated prepolymers based on those compounds and methylene bis(phenylisocyanates).

Recently, there have been disclosed poly(amino aromatic) compounds of the structure

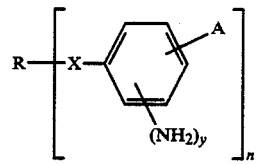

where R is an n-valent group obtained by the removal of the hydroxyl or mercapto groups from an n-valent polyol or polythio having a molecular weight of from 400 to about 12,000, A is hydrogen or an inert substituent, X represents oxygen or sulfur, n represents an integer of from 2 to 8, and y is 1 or 2. See European Pat. No. Application 0,268,849 and U.S. application Ser. No. 183,556, filed Apr. 19, 1988. Such compounds are described as useful in preparing polyurethane elastomers.

DESCRIPTION OF THE INVENTION

The present invention is broadly directed to a liquid, storage stable, isocyanate-terminated prepolymer having an isocyanate group content of from 3 to 30 percent by weight and preferably from 14 to 25 percent by weight, prepared by reacting (i) an isocyanate selected from the group consisting of methylene bis(phenylisocyanates), polymethylene poly(phenylisocyanates), and mixtures thereof, with (ii) a polyamine of the structure

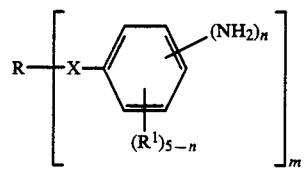

where R represents an m-valent residue obtained by the removal of m functional groups, such as hydroxy or mercapto groups, from a compound having m functional groups and having a molecular weight of from 76 to about 10,000, X represents

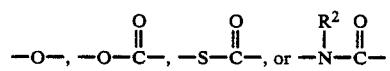

each $R^1$, which can be the same or different, represents hydrogen or an inert substituent, such as a $C_1$ to $C_3$ alkyl group, $R^2$ represents hydrogen, a $C_1$ to $C_4$ alkyl group or a phenyl group, n is 1 or 2, and m is an integer of from 2 to 8.

By "inert substituent" is meant any substituent that does not react with an amine, nitro, hydroxyl or isocyanate group, and includes lower alkyl of from 1 to 8 carbon atoms, such as methyl, ethyl, propyl, butyl and the like; $C_8$ to $C_{12}$ aryl groups: $C_7$ to $C_{10}$ aralkyl groups: $C_4$ to $C_6$ cycloalkyl groups and $C_1$ to $C_8$ alkoxy groups.

The isocyanates used to prepare the prepolymers of the present invention are selected from the group consisting of methylene bis(phenylisocyanates), polymethylene poly(phenylisocyanates) and mixtures thereof. By "methylene bis(phenylisocyanates)" are meant the 2, 2'-, the 2, 4'- and the 4, 4'-isomers and mixtures thereof. It is generally preferred to use the pure 4, 4'-isomer. The polymethylenepoly(phenylisocyanates) used herein are known and are typically prepared by the phosgenation of the corresponding methylene bridged poly(phenylamines), which are conventionally produced by the reaction of formaldehyde and primary aromatic amines. Known processes for the preparation of the amine/formaldehyde condensates as well as the phosgenated products thereof are described in the literature. See, e.g., U.S. Pat. Nos. 2,683,730, 2,950,263, 3,012,008, 3,344,162, and 3,362,979. Useful mixtures of isocyanates typically contain from 20 to 100% by weight of the diisocyanates with the remainder being polyisocyanates.

The isocyanates are reacted with polyamines of the structure

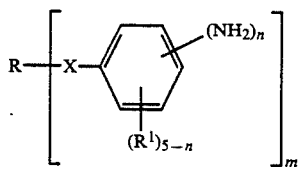

where R, $R^1$, X, m and n are as defined above. The production of such polyamines is generally known and is described in U.S. Pat. Nos. 3,808,250, 3,817,940, 3,929,863, 3,975,428, 4,016,143, 4,136,091, 4,169,206, 4,260,557, 4,186,257, 4,228,249, 4,504,648, 4,515,981, 4,732,959 and 4,328,322, the disclosures of which are all herein incorporated by reference.

Urea group-containing prepolymers are generally prepared by adding the amine, which is at a temperature of from 25° to 60° C. (and preferably at room temperature), to the isocyanate, which is typically at a temperature of from 25° to 60° C. The mixture is stirred and held at from 40° to 60° C. for a period of from 5 minutes to 1 hour. The product is then cooled to room temperature. Biuret group-containing prepolymers can be prepared by holding the reaction mixtures at temperatures of from 90° to 130° C. for from 15 minutes to two hours, and then quench cooling the product to room temperature. In preparing the biuret prepolymer, it is preferred to heat the mixture to the 90° to 130° C. range as rapidly as possible.

One particularly preferred group of polyamines are those of the structure:

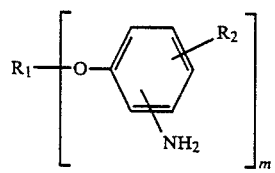

wherein
$R_1$ denotes an m-valent residue obtained by the removal of m-hydroxyl groups from a polyhydroxyl compound having m-hydroxyl groups and having a molecular weight of 76 to about 10,000, preferably from 76 to about 6000.

$R_2$ denotes a methyl group or preferably hydrogen and m denotes an integer with a value of from 2 to 8, preferably from 2 to 4 and most preferably 2. Such compounds are prepared by first reacting an m-valent polyhydroxyl compound with a nitro halogen benzene to form the corresponding nitrophenoxy adduct, and thereafter hydrogenating the adduct to form the corresponding amino phenoxy product. Further details as to the production of the preferred amines can be found in European Patent Application 0,268,849, and in U.S. application Ser. No. 183,556, filed Apr. 19, 1988, the disclosures of which are herein incorporated by reference.

The invention is further illustrated but is not intended to be limited by the following examples in which all parts and percentages are by weight unless otherwise specified.

EXAMPLES

In the examples, the following materials were used:
TPG: tripropylene glycol.
POLYOL-A: the reaction product of propylene glycol and propylene oxide having an OH number of about 112.
POLYOL-B the reaction product of propylene glycol and propylene oxide having an OH number of about 250.
POLYOL-C the reaction product of propylene glycol and propylene oxide having an OH number of about 364.
POLYOL-D the reaction product of propylene glycol and propylene oxide having an OH number of about 56.
POLYOL-E: the reaction product of glycerine and propylene oxide having an OH number of about 56.
POLYOL-F the reaction product of glycerine and propylene oxide having an OH number of about 112.
POLYAMINE-A:

To a stirred solution of 192 grams (1 mole) of TPG, 410 grams (2.6 moles) of ortho-chloronitrobenzene, and 600 ml of dimethylsulfoxide, were added 140 grams (3.5 moles) of granular sodium hydroxide over a 2 hour period. The temperature was maintained at between 55° and 60° C. during the addition of the NaOH. After the NaOH addition was complete, the reaction mixture was stirred at 55° C. for an additional 4.5 hours. To the cooled reaction mixture were added 1200 ml distilled water and enough concentrated hydrochloric acid to neutralize any excess NaOH. The layers were separated and the organic layer was again washed with distilled water (4 times with 1000 ml). After the last washing, the residual water and ortho-chloronitrobenzene were removed by vacuum distillation. The reaction mixture was then filtered to obtain 338 grams of a dark liquid were charged to a one liter, high pressure hydrogenation reactor followed by the addition of 168 grams of methanol and 10.2 grams of Raney nickel. The reaction mixture was stirred under a 1000 psi hydrogen gas pressure while being slowly heated over a 30 minute period to 130° C. After one hour at 130° C., hydrogen gas uptake had ceased. The reaction mixture was cooled and the Raney nickel was removed by filtration. The methanol and any low boiling materials present were removed by vacuum distillation. 250 grams of a dark liquid (8960 mPa.s at 25° C.) having an amine number of about 273 (corresponding to a 91% conversion) was obtained.

Using the identical procedure as described for POLYAMINE-A, the following polyamines were prepared:

| POLY-AMINE | POLYOL USED | AMINE NO. | % AMINE CONVER. | VISCOSITY AT 25° C. (mPa · s) |
|---|---|---|---|---|
| B | A | 85.7 | 90.4 | 670 |
| C | B | 170 | 95.8 | 1532 |
| D | C | 220 | 96.9 | 2100 |

POLYAMINE-E:

To a stirred solutioin of 150.3 grams (0.05 mole) of POLYOL-E and 35.5 grams of ortho-chloronitrobenzene were added 9.0 (0.23 mole) of granular NaOH. The temperature of the reaction mixture was maintained at 65° C. during the addition of the NaOH. The reaction mixture was then stirred at 65° C. for an additional 8 hours. To the stirred reaction mixture was added 200 grams of distilled water and enough concentrated hydrochloric acid to make the mixture acidic. The resultant acidic mixture was heated to 120° C. at 1 mm Hg to remove any excess ortho-chloronitrobenzene and water. The mixture was then filtered to obtain 143 grams of a dark red, clear liquid. The resultant liquid was then reduced using the process described for POLYAMINE-A to yield a dark liquid (1224 mPa.s at 25° C.) having an amine number of about 48 (corresponding to a 92.4% amine conversion).

Using the same process, the following additional polyamines were prepared:

| POLY-AMINE | POLYOL USED | AMINE NO. | % AMINE CONVER. | VISCOSITY AT 25 C. (mPa · s) |
|---|---|---|---|---|
| F | D | 47.4 | 92.8 | 812 |
| G | F | 81 | 85.0 | 1148 |

POLYAMINE-H:

To a 3-neck flask equipped with a mechanical stirrer, thermometer, condenser and purged with dry nitrogen, were added 250 grams of POLYOL-A, 80 grams of isatoic anhydride and 2.0 grams of KOH. The reaction mixture was heated to 90° C. and held for 20 hours. To the reaction mixture was then added a mixture of 30 grams of distilled water and 1.1 grams of concentrated sulfuric acid. After mixing, 200 ml of toluene was added and then removed by atmosphere distillation. The reaction mixture was then held at 110° C. at 1 mm Hg pressure to remove the last traces of toluene and water. The product was then filtered to yield 298 grams of a light brown, clear liquid having a viscosity of 1950 mPa.s at 25° C. The amine number of the product was about 83 which corresponded to a 91% conversion of the polyol to the amine.

POLYAMINE-J:

Using the procedure described for POLYAMINE-H, POLYOL-B was converted to an amine having a viscosity of 11,060 mPa.s at 25° C. and an amine number of 146, which corresponded to an 86% conversion.

POLYAMINE-K:

To a stirred 3-neck flask was added 200 grams of an aminated, difunctional 2000 molecular weight polyoxypropylene diol (Jeffamine D-2000, available from Texaco). 32.6 grams of isatoic anhydride was then added. The stirred reaction mixture was heated to 80° C. and held for 3 hours. The reaction mixture was then cooled to 25° C. to yield a dark clear liquid having a viscosity of 5790 mPa.s at 25° C.

POLYAMINE-L:

To a stirred 3-neck flask were added 44.4 grams of an aminated difunctional 888 molecular weight polyoxypropylene diol (Jeffamine DU-700, available from Texaco) and 100 grams of Jeffamine D-2000. To this was then added 32.6 grams of isatoic anhydride. The stirred reaction mixture was heated slowly over a 2 hour period to 80° C. and then held at 80° C. for 1.5 hours. The reaction mixture was then cooled to 25° C. to yield a dark clear liquid having a viscosity of 23,600 mPa.s at 25° C.

POLYAMINE-M:

To a stirred solution of 764 grams (0.75 moles) of POLYOL-A, 313 grams (2.0 moles) of para-chloronitrobenzene and 1000 ml of dimethylsulfoxide, were added 107 grams (2.7 moles) of granular NaOH over a 3 hour period. The temperature was maintained at between 60° and 65° C. during the addition of the NaOH. After the NaOH addition was complete, the reaction mixture was stirred at 65° C. for an additional 12 hours. The mixture was then worked up as described for POLYAMINE-A to yield a dark red, clear liquid. The liquid was reduced using the process described for POLYAMINE-A to yield a dark liquid having a viscosity of 640 mPa1s at 25° C. and an amine number of about 95, which corresponded to a 100% conversion.

MDI x/y:

x represents the total amount of diisocyanate in the isocyanate and y represents the total amount of the 2, 2' and 2, 4'-isomers of methylene bis(phenylisocyanate) in the isocyanate. When x is less than 100, the difference is made up of the higher homologs of methylene bis(-phenylisocyanate). When X is less than 100, the isocyanate group content, in each instance, is about 33% by weight.

EXAMPLE 1

15.0 grams of POLYAMINE-A were added with stirring over a 5 minute period to 104.6 grams of MDI 100/2 while holding the temperature at 50° C. The temperature was then raised over a 12 minute period to 120° C. and then held at that temperature for 40 minutes. The mixture was then quench-cooled to 25° C. The resultant clear, biuret group-containing prepolymer had an NCO content of 23.6% and a viscosity at 25° C. of 1230 mPa.s.

EXAMPLE 2

27.0 grams of POLYAMINE-A were added with stirring over a 5 minute period to 223 grams of MDI 81/33 while holding the temperature at 50° C. A 50 gram sample of the urea prepolymer was removed from the reaction mixture and was cooled to 25° C. The product was a stable dark clear liquid having an NCO content of 25.8%.

The remaining reaction mixture was heated to 120° C. over a 5 minute period and then held for 40 minutes, followed by quench cooling to 25° C. The resultant clear biuret prepolymer had an NCO content of about 24% and a viscosity at 25° C. of 4670 mPa.s.

EXAMPLE 3

443 grams of POLYAMINE-C were added with stirring over a 22 minute period to 1807 grams of MDI 100/2 while holding the temperature at 50° C. The temperature was then raised over a 30 minute period to 120° C. and held at that temperature for 40 minutes, followed by quench cooling to 25° C. The clear biuret prepolymer had an NCO content of 21.3% and a viscosity at 25° C. of 2960 mPa.s.

EXAMPLE 4

500 grams of POLYAMINE-C were added with stirring over a 30 minute period to 1498 grams of MDI 100/2 while holding the temperature at 50° C. The temperature was held at 50° C. for 10 minutes and then quench cooled to 25° C. The clear urea prepolymer had an NCO content of 20.9% and a viscosity at 25° C. of 1264 mPa.s.

EXAMPLES 5 THROUGH 36

Examples 5 through 21 used the process of Example 3, while Examples 22 through 36 used the process of Example 4. The materials used and the results obtained were as set forth in the following table:

TABLE

| EXAMPLES | POLYAMINE USED | PBW, POLYAMINE | MDI ISO-CYANATE USED | PBW ISOCYANATE | % BY WEIGHT NCO CONTENT | VISCOSITY @ 25° C. mPa.·s |
|---|---|---|---|---|---|---|
| 5 | J | 52 | 86/37 | 154 | 20.4 | 7420 |
| 6 | G | 45 | 100/2 | 100 | 18.1 | 7620 |
| 7 | B | 68 | 100/2 | 155 | 18.4 | 1708 |
| 8 | F | 65 | 100/2 | 100 | 16.8 | 1600 |
| 9 | D | 45 | 100/2 | 255 | 23.2 | 1420 |
| 10 | F | 28 | 78/25 | 100 | 23.2 | 436 |
| 11 | M | 65 | 100/2 | 152 | 19.0 | 4300 |
| 12 | F | 32 | 79/7 | 100 | 22.6 | 432 |
| 13 | H | 45 | 100/2 | 100 | 19.0 | 2040 |
| 14 | E | 54 | 100/2 | 100 | 18.8 | 1248 |
| 15 | J | 25 | 100/2 | 100 | 22.1 | 1860 |
| 16 | E | 32 | 79/7 | 100 | 22.5 | 568 |
| 17 | K | 64 | 100/2 | 125 | 18.3 | 1800 |
| 18 | L | 38 | 100/2 | 100 | 19.5 | 2650 |
| 19 | H | 51 | 86/37 | 149 | 21.1 | 1150 |
| 20 | K | 56 | 86/37 | 144 | 20.8 | 920 |
| 21 | L | 52 | 86/37 | 148 | 20.5 | 1970 |
| 22 | B | 65 | 100/2 | 135 | 19.9 | 492 |
| 23 | F | 55 | 100/2 | 55 | 14.4 | 1496 |
| 24 | D | 74 | 100/2 | 264 | 21.7 | 2135 |
| 25 | F | 35 | 78/25 | 100 | 22.5 | 340 |
| 26 | H | 55 | 100/2 | 100 | 19.2 | 984 |
| 27 | F | 37 | 79/7 | 100 | 22.6 | 328 |
| 28 | J | 35 | 100/2 | 100 | 21.2 | 1320 |
| 29 | E | 37 | 79/7 | 100 | 22.4 | 344 |
| 30 | C | 40 | 81/33 | 160 | 22.1 | 1760 |
| 31 | J | 52 | 86/37 | 154 | 21.8 | 1980 |
| 32 | H | 51 | 86/37 | 149 | 22.1 | 640 |
| 33 | K | 56 | 86/37 | 144 | 21.7 | 620 |
| 34 | L | 52 | 86/37 | 148 | 21.9 | 890 |
| 35 | G | 60 | 100/2 | 100 | 17.6 | 2168 |
| 36 | E | 35 | 78/25 | 100 | 22.6 | 358 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, storage-stable isocyanate prepolymer having an isocyanate group content of from 3 to 30% by weight, prepared by reacting
   (i) an isocyanate selected from the group consisting of methylene bis(phenylisocyanates), polymethylene poly(phenylisocyanates), and mixtures thereof, and
   (ii) a polyamine of the structure

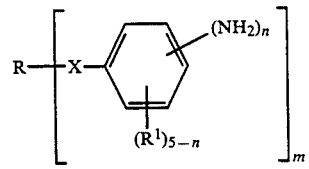

where R represents an m-valent residue obtained by the removal of m-functional groups from a compound having m-functional groups and having a molecular weight of from 76 to about 10,000, X represents

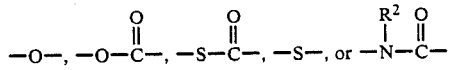

$R^1$ represents hydrogen or an inert substituent,
$R^2$ represents hydrogen, a $C_1$ to $C_5$ alkyl group or a phenyl group,
n is 1 or 2, and
m is an integer of from 2 to 8.

2. The prepolymer of claim 1 having an isocyanate group content of from 14 to 25% by weight.

3. The prepolymer of claim 1 wherein $R^1$ represents hydrogen, m is 2 and X is —O—.

* * * * *